United States Patent [19]
Taylor

[11] Patent Number: 4,857,081
[45] Date of Patent: Aug. 15, 1989

[54] SEPARATION OF WATER FROM HYDROCARBONS AND HALOGENATED HYDROCARBONS

[75] Inventor: John A. Taylor, Pinckney, Mich.

[73] Assignee: Separation Dynamics, Inc., Southfield, Mich.

[21] Appl. No.: 194,984

[22] Filed: May 17, 1988

Related U.S. Application Data

[63] Continuation-in-part of Ser. No. 108,752, Oct. 15, 1987, abandoned, which is a continuation-in-part of Ser. No. 880,783, Jul. 1, 1986, abandoned.

[51] Int. Cl.$^4$ .................................. B01D 53/22
[52] U.S. Cl. ........................... 55/16; 55/68; 55/158; 210/645
[58] Field of Search ................ 55/16, 158, 68; 210/645, 500.23, 500.29; 264/40.3

[56] References Cited

U.S. PATENT DOCUMENTS

| | | | |
|---|---|---|---|
| Re. 32,277 | 11/1986 | Tsuge et al. | 210/500.29 |
| 2,223,586 | 12/1940 | Thomas | 55/158 |
| 2,617,493 | 11/1952 | Jones | 55/16 |
| 2,958,657 | 11/1960 | Binning et al. | 210/500.29 X |
| 2,960,462 | 11/1960 | Lee et al. | 210/500.29 X |
| 2,981,680 | 4/1961 | Binning | 55/16 X |
| 3,367,850 | 2/1968 | Johnson | 55/158 X |
| 3,442,002 | 5/1969 | Geary, Jr. et al. | 55/158 X |
| 3,494,174 | 2/1970 | Green et al. | 55/158 X |
| 3,735,558 | 5/1973 | Skarstrom et al. | 55/16 |
| 3,735,559 | 5/1973 | Salemme | 55/16 |
| 3,793,111 | 2/1974 | Judkins | 55/158 X |
| 3,797,202 | 3/1974 | Neulander et al. | 55/158 |
| 4,031,012 | 6/1977 | Gics | 55/158 X |
| 4,220,535 | 9/1980 | Leonard | 55/158 X |
| 4,231,877 | 11/1980 | Yamauchi et al. | 210/500.29 X |
| 4,235,983 | 11/1980 | Steigelmann et al. | 55/16 X |
| 4,267,047 | 5/1981 | Henne et al. | 210/500.29 X |
| 4,268,279 | 5/1981 | Shindo et al. | 55/16 |
| 4,276,172 | 6/1981 | Henne et al. | 210/500.29 X |
| 4,288,494 | 9/1981 | Porter et al. | 210/645 X |
| 4,293,418 | 10/1981 | Fujii et al. | 55/158 X |
| 4,333,906 | 6/1982 | Porter et al. | 264/40.3 |
| 4,341,005 | 7/1982 | Oscarsson | 55/158 X |
| 4,421,529 | 12/1982 | Revak et al. | 55/16 |
| 4,466,202 | 8/1984 | Merten | 55/158 X |
| 4,535,028 | 8/1985 | Yokogi et al. | 55/158 X |
| 4,583,996 | 4/1986 | Sakata et al. | 55/158 X |

FOREIGN PATENT DOCUMENTS

| | | | |
|---|---|---|---|
| 159783 | 10/1985 | European Pat. Off. | 55/158 |
| 2327106 | 11/1974 | Fed. Rep. of Germany | 55/158 |
| 6168 | 2/1979 | Japan | 55/158 |
| 13653 | 2/1979 | Japan | 55/158 |
| 15349 | 2/1979 | Japan | 55/158 |
| 152679 | 12/1979 | Japan | 55/16 |
| 94621 | 7/1980 | Japan | 55/158 |
| 51505 | 3/1985 | Japan | 55/158 |
| 65107 | 4/1985 | Japan | 210/500.29 |
| 99310 | 6/1985 | Japan | 210/500.29 |
| 238120 | 11/1985 | Japan | 55/158 |
| 25621 | 2/1986 | Japan | 55/158 |
| 2032340 | 5/1980 | United Kingdom | 210/500.23 |
| 2134814 | 8/1984 | United Kingdom | 55/16 |
| 2139110 | 11/1984 | United Kingdom | 55/16 |

*Primary Examiner*—Robert Spitzer
*Attorney, Agent, or Firm*—Reising, Ethington, Barnard, Perry & Milton

[57] ABSTRACT

An apparatus for separating water from a water and hydrocarbon mixture and water from a water and halogenated hydrocarbon mixture includes membranes consisting essentially of nonporous self-supported hollow fibers of cuproammonium cellulose, the membranes including inner and outer surfaces, and a conduit for conducting a stream of the mixture of hydrocarbon and water into contact with one of the membranes. The membranes imbibe water from the stream to diffuse to the other side of the membranes. The water is then removed from the other side of the membrane.

7 Claims, 3 Drawing Sheets

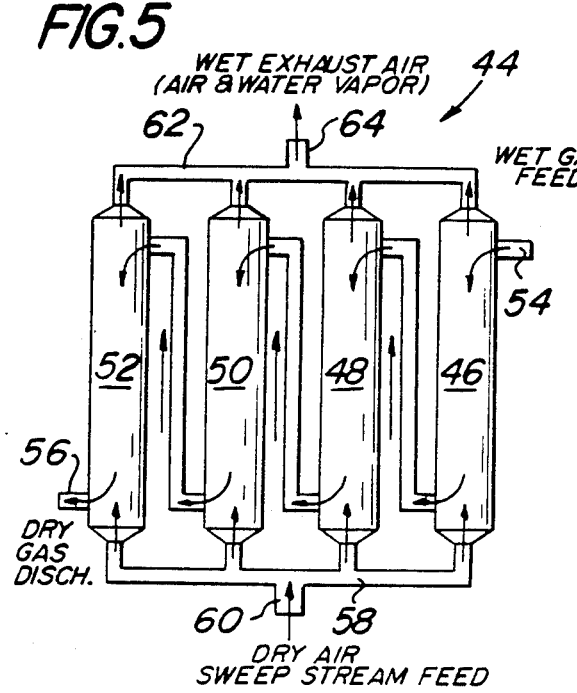
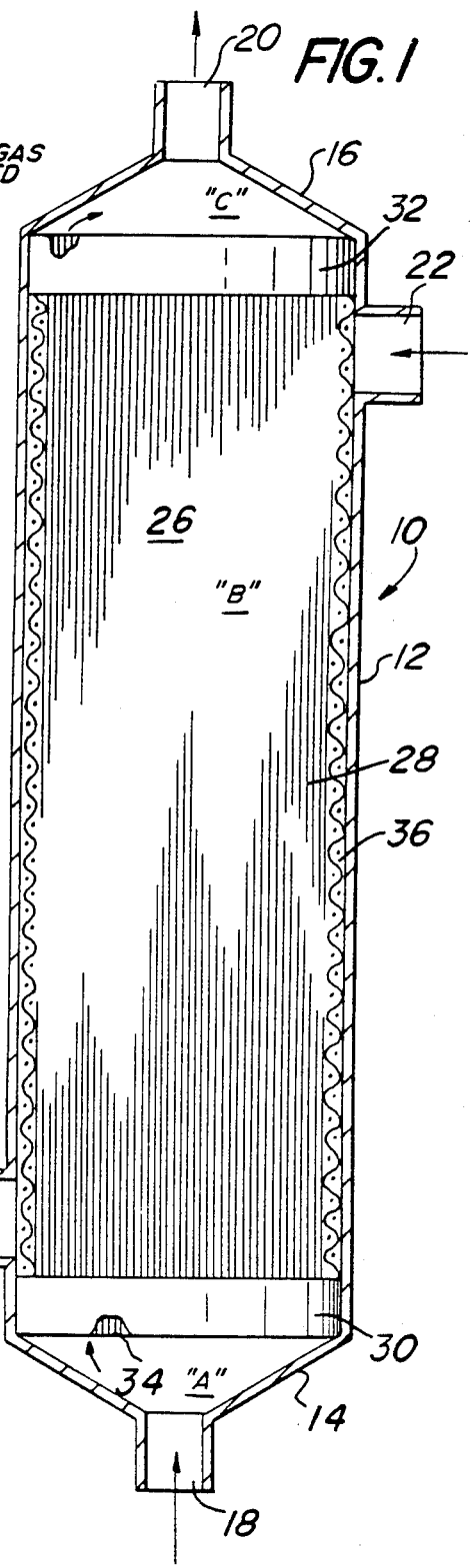
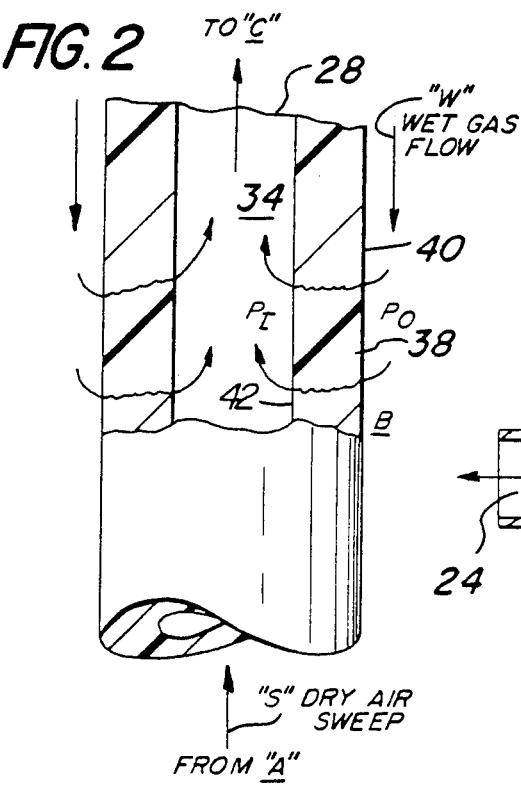

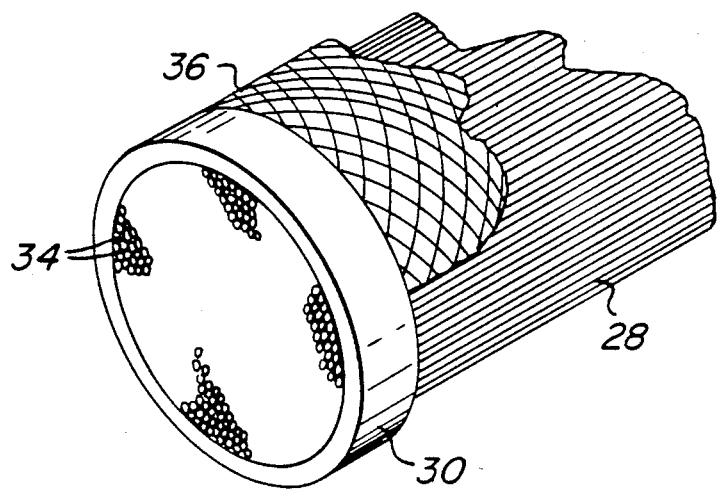
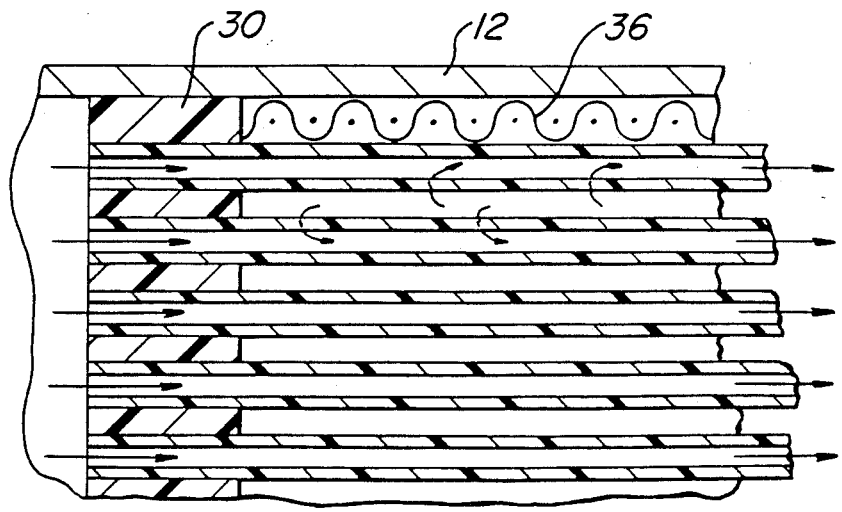

SEPARATION OF WATER FROM HYDROCARBONS AND HALOGENATED HYDROCARBONS

This is a continuation-in-part application of U.S. Ser. No. 108,752, filed Oct. 15, 1987, now abandoned, which was a continuation-in-part application of U.S. Ser. No. 880,783, filed July 1, 1986, now abandoned.

TECHNICAL FIELD

This invention relates to an apparatus and method for separating water from a water and hydrocarbon mixture. More particularly, the present invention relates to a method for the dehydration of gases and the decontamination of water contaminated with hydrocarbons.

BACKGROUND OF THE INVENTION

The separation of water from either hydrocarbon or halogenated hydrocarbons contaminants found in chemical industrial waste or from gaseous hydrocarbons generally requires a separation system capable of prolonged exposure to hydrocarbons without chemical degeneration or fouling. Chemical degradation is the attack of the hydrocarbon or halogenated hydrocarbon on the chemical components of the separation device, such as the separation membranes, generally leading to chemical degradation and failure of the membrane system. Michaels writing in "Ultralfiltration Membranes and Applications", "Polymer Science and Technology", vol. 13, 1979, describes fouling as a phenomenon whereby a membrane, under normal operating conditions develops a resistance to flow and severely limits transmembrane permeate throughput (concentration polarization).

Another general aspect involved in water-hydrocarbon separations are the problems that arise from the separation of molecules that are approximately the same size. For example, water molecules are about the same size as methane molecules. Hence, porous membrane systems having the most microscopic porosity presently available are not capable of distinguishing between water and methane. Other membranes or otherwise chemically treated membranes which are hydrophilic still pass water and methane through their pores because of the flow dynamics of the water through the pores of the membrane.

Water vapor is often found as an impurity in industrial gas streams, requiring its removal before or during use or processing of the gas streams. For example, natural gas, the principal component of which is methane, contains in its natural state substantial quantities of physically entrained water. In numerous industrial processes it is desirable or necessary that such gas be dried.

Conventional prior art processes for drying natural gas have exploited the solubility of water in certain substances, such as methanol or glycol, by passing the wet gas through a bath or curtain of the scrubbing fluid. In such processes, the scrubbing fluid, when saturated, is regenerated by driving off the water, usually by heat generated by the combustion of well-head gas. The costs inherent in such processes include the costs of the well-head gas used in regeneration of water-saturated sorbent liquid as well as the cost of sorbent liquid itself.

In other prior art arrangements, molecular sieve adsorbents are used, the wet gas typically being passed through a bed providing the molecular sieve. Here again, the need for regeneration or replacement of the bed gives rise to substantial energy costs.

Desiccation using solid adsorbents, and mechanical operations (cooling or refrigeration to induce precipitation) have also been used.

The U.S. Pat. No. 3,735,559 to Salemme, issued May 29, 1973 discloses sulphonated polyxylyene oxide membranes for the separation of water vapor from other gases. The membranes are supported by a support structure which obstructs portions of the membrane surface. The flat membranes are supported between two base screens forming a sandwiched flat membrane assembly. The application further discusses problems encountered with such membranes, such as ruptures and linear shrinkage.

The U.S. Pat. No. 4,421,529 to Revak et al, issued Dec. 20, 1983, discloses a process for separating gases using hollow fiber membranes on an intermittent basis. The patent discloses that the hollow fibers can be made from various materials, including cellulose esters or ethers, and preferably asymmetric cellulose acetate. These membranes are porous membranes which literally filter the hydrocarbon fluid. By being porous, hydrocarbon is able to flow through the pores. Additionally, these membranes are approximately 250 microns thick, the thickness of the membrane contributing negatively to the flow dynamics of the system.

As disclosed in the article entitled "Reverse Osmossis: A New Field of Applied Chemistry and Chemical Engineering", by S. Sourirajan, the founder of cellulose acetate membranes, published in "Synthetic Membranes", vol. 1, 1981, cellulose acetate membranes comprise an asymmetric porous film. Such a porous film is used for preferential absorption of one of the constituents of a solution at the interface of the film. It is undisputed, as shown by electron microscopy, as shown by Kesting in FIG. 2.17 page 40 of "Synthetic Polymeric Membranes", 1971, cellulose acetate ultrafiltration membranes are a cohesive system consisting of open celled foams, i.e. vacules with breached walls. Fastening the cellular network together are long ribs extending in three dimensions.

Cellulose acetate and cellulose ether membranes dissolve or disintegrate in the presence halogenated hydrocarbons. The hydrocarbons tend to chemically degrade the exposed ether or acetate groups exposed to the hydrocarbon from the surface of the membrane.

The U.S. Pat. No. 3,442,002 to Geary, Jr. et al, issued May 6, 1969, discloses a method of manufacture of fluid separation apparatus wherein the apparatus may include a plurality of separation modules.

The U.S. Pat. No. 2,981,680 to Binning, issued Apr. 25, 1961, discloses a process for separating molecular solutions of a mixture of components, the process including the utilization of two or more dissimilar (having different compositions) permeation membranes. The patent discloses the use of "regenerated" cellulose (type 300PT). Type 300PT cellulose is a cellulose acetate. The terminology "regenerated cellulose" is used in the patent to mean chemically modified reconstituted cellulose. The term "regenerated cellulose" is usually meant to more strictly mean unchemically modified cellulose such as that produced by the viscous or cuproammonium regeneration processes. Cellulose regenerated by the latter two mentioned processes is substantially similar to natural cellulose, the regenerated cellulose from these processes not being chemically altered. Chemically altered cellulose membranes, such as cellulose acetate, are used for producing porous membranes, usually asymmetric membranes for filtration processes. These chemically altered membranes are susceptible to degradation in the presence of hydrocarbons, such as methane.

The U.S. Pat. No. 3,735,558 to Skarstrom et al discloses a process for separating fluids and an apparatus to be used therewith. The apparatus separates water vapor from air by creating a pressure gradient across the walls of permeable tubes to induce permeation therethrough. A counter current reflux flow induces a longitudinal concentration gradient along the walls of permeable tubes which enhances permeation of key components through the walls of the tubes thereby separating them from a mixed fluid feed. The Skarstrom et al patent does not disclose the use of cuproammonium cellulose membranes nor does it address the problems of separating hydrocarbons from water. Finally, the Skarstrom et al patent discloses the use of semipermeable membranous hollow members which are porous as opposed to a nonporous separating membrane.

The Japanese patents 13,653 issued Feb. 1, 1979 and 152,679 issued Dec. 1, 1979 both disclose the use of cuproammonium rayon to selectively pass water vapor therethrough. Although the Japanese references, just as the other references discussed above, disclose the ability of cuproammonium cellulose membranes to pass water therethrough, there is no disclosure or suggestion of the ability of cuproammonium cellulose membranes to withstand continued and prolonged exposure to a hydrocarbon or halogenated hydrocarbon water mixture without fouling or chemical degeneration of the membrane.

The present invention relates to a diffusion type membrane which is capable of being made into ultra-thin fibers thereby contributing positively to the flow dynamics by presenting a minimal path for the water separated from the hydrocarbon to travel. The present invention further provides an unsupported membrane requiring no additional support which blocks portions of the membrane from direct contact with the flowing hydrocarbon fluid. The invention further provides a membrane that is unexpectedly resistant to degradation in the presence of hydrocarbons, such as methane. Thus, the present invention provides an apparatus and method for significantly more efficiently separating water and dissolved water soluble components from a hydrocarbon fluid.

SUMMARY OF THE INVENTION

An apparatus for separating water from a water and hydrocarbon mixture includes separation means including membrane means consisting of nonporous self-supported hollow fibers of cuproammonium cellulose, the membranes including inner and outer surfaces. First conduit means conducts a stream of the mixture of hydrocarbon and water into contact with one side of the membranes. The membranes imbibe water from the stream to diffuse to the other side of the membrane. Removing means removes the water from the other side of the membrane.

The invention further provides a method of separating water from a water and hydrocarbon mixture including the steps of conducting a water and hydrocarbon mixture into contact with one side of a membrane consisting essentially of nonporous self-supported hollow fibers of cuproammonium cellulose having inside and outside surfaces, imbibing the water from the mixture into the membranes and diffusing the water to the opposite side of the membranes, removing the water from the second side of the membranes, and removing the remaining mixture from the first side of the membranes.

FIGURES IN THE DRAWINGS

Other advantages of the present invention will be readily appreciated as the same becomes better understood by reference to the following detailed description when considered in connection with the accompanying drawings wherein:

FIG. 1 is a cross-sectional view, in side elevation, of a representative apparatus, in accordance with the invention, for the drying of a gas stream;

FIG. 2 is a partial cross-sectional view of a single fiber of a kind used to make a form of membrane in accordance with the invention;

FIG. 3 is a partial pictorial view, showing the manner in which ends of the fibers which make up a membrane are encapsulated in one form of the apparatus, so as to form a tube bundle and present the open ends of the bores of the fibers for passage of a sweep air stream;

FIG. 4 is an enlarged cross-sectional view of a portion of a membrane in accordance with the present invention;

FIG. 5 illustrates a multi-chamber (staged) drying apparatus in accordance with the invention, using membranes of the kind depicted in FIGS. 1 to 4.

DETAILED DESCRIPTION OF THE INVENTION

Figure 6:
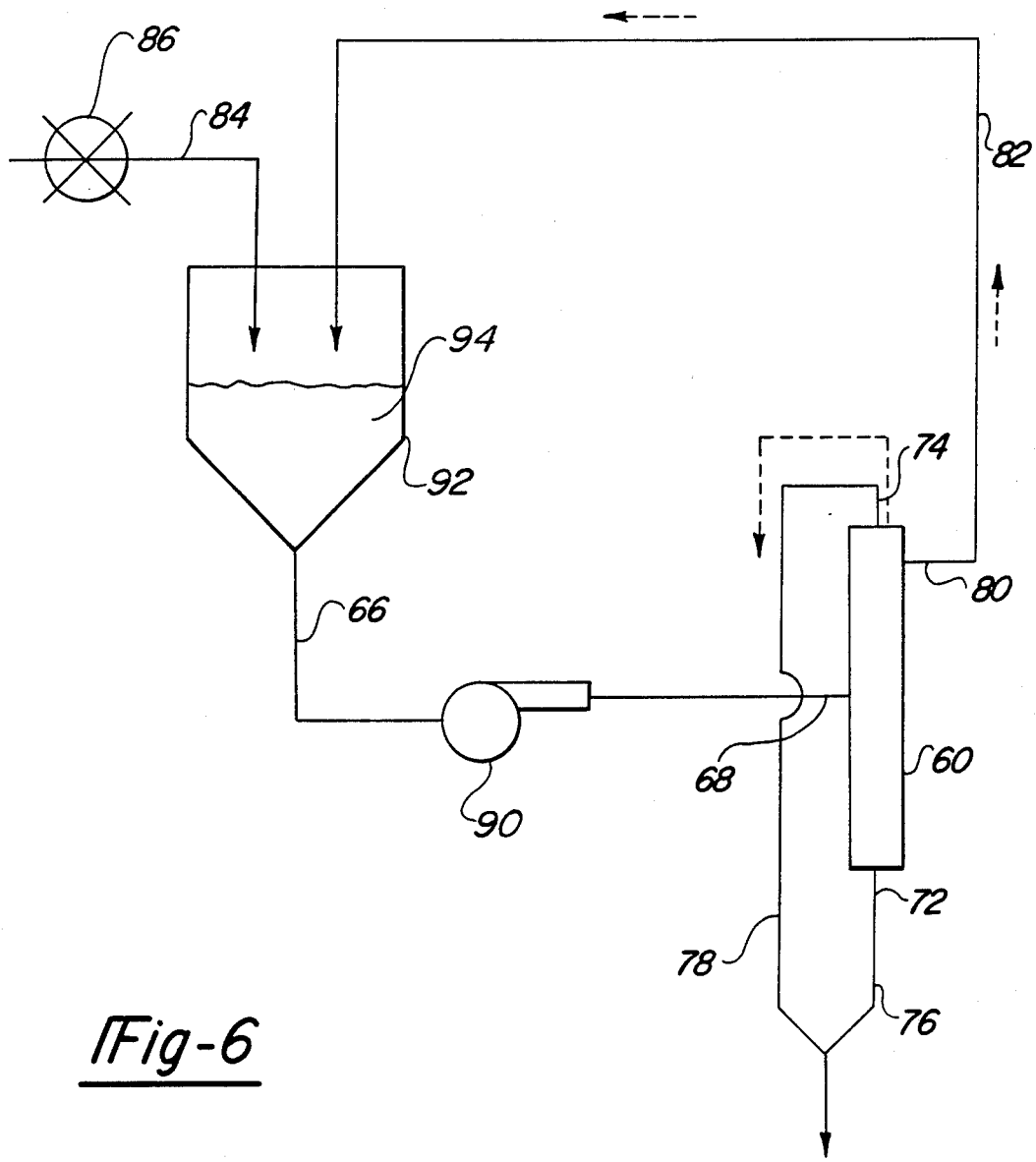
FIG. 6 is a schematic illustration of a second embodiment of the present invention.

Referring now to the drawings in detail, wherein like reference numerals indicate like elements, there is seen in FIG. 1 filter apparatus designated generally by the reference numeral 10.

The apparatus 10 comprises a shell, or housing, 12, which in the illustrated form is elongated and generally cylindrical. Respective ends of the housing 12 are provided with caps, as at 14 and 16, the caps having axially disposed ports 18 and 20.

Adjacent to respective ends of the housing 12, and extending into fluid communication with the interior of the housing 12, are respective ports 22 and 24.

Extending axially within the housing 12, and forming a membrane designated generally by the reference numeral 26 is a bundle of hollow hydrophilic fibers 28. The fibers 28 are made of regenerated cellulose, and preferably have an internal (bore) diameter of about 200 microns ($\pm 10\%$). By regenerated cellulose, it is meant that the cellulose used is cuproammonium regenerated cellulose. Cuproammonium regenerated cellulose is nonchemically derivatized cellulose in substantially its natural state. The cuproammonium regenerated cellulose is chemically sheets of cellulose molecules. The specific ultrastructure is not known but it is known that the sheets have no pores extending therethrough. There is heavy hydrogen bonding between the sheets creating a highly crystalline structure. The structure is quite hydrophilic and provides aqueous pathways for water and dissolved Water soluble materials diffusion. The cuproammonium regenerated cellulose provides membranes which are significantly thinner than membranes made by chemically derivatized cellulose materials, such as cellulose acetate. Materials diffusing through the cuproammonium cellulose membranes travel a significantly smaller distance than materials traveling through cellulose acetate membranes. Thus, the cuproammonium cellulose membranes have a significant positive effect on the flow dynamics by presenting a significantly smaller yet more effective barrier over which only the diffusing water and dissolved water soluble components pass.

Unlike prior art cellulose acetate membranes which are asymmetric microporous membranes, the cuproammonium cellulose membranes of the present invention are nonporous. Unlike prior art membranes which expose ether or acetate groups to the adjacent outer environment, cuproammonium cellulose membranes expose hydroxyl groups thereby providing an nondegradative chemical layer not susceptible to dissolution or disintegration by hydrocarbons or halogenated hydrocarbons. Also, unlike prior uses for cuproammonium cellulose membranes in the drying of air or in medical dialysis equipment where cuproammonium cellulose membranes were used in aqueous environments, applicant has found cuproammonium cellulose to have the unexpected ability, due to its chemical nature, to not chemically degrade in the presence of hydrocarbons. This resistance to fouling provides the present invention with the unexpected ability to continuously separate water from a water-hydrocarbon or water halogenated hydrocarbon mixture without fouling.

Techniques for making hollow fibers of kinds satisfactory for use in the present invention, from cuproammonium cellulose, are disclosed in U.S. Pat. Nos. 4,288,494 to Christopher H. Porter and John A. Taylor, issued Sept. 8, 1981, and 4,333,906, issued June 8, 1982, also to Porter and Taylor. Such other techniques as may occur to those skilled in the art might also be used.

Spaced walls 30 and 32 sealingly engage the interior wall of the housing 12, and in effect divide the interior of the housing 12 into end chambers "A" and "C" and a central chamber "B". The walls 30 and 32 retain and encapsulate the ends of the fibers 28, but, as is illustrated in FIG. 1 (and is also seen in greater detail in FIGS. 3 and 4), leave open and in fluid communication with the chambers "A" and "C" the bores 34 of the fibers 28.

A screen 36 may be provided, if desired, between the membrane 26 and shell 12, to stabilize the membrane and reinforce it structurally but the individual fibers are not externally supported.

It should now be apparent that the apparatus 10 provides two distinct fluid flow paths through the housing 12. In particular, it will be seen that fluid admitted to the housing 12 through the port 22 will flow axially within the housing 12 in contact with the external surface of the fibers 28 and axially within the housing 12 toward the port 24 thereby providing conducting means from the source of the hydrocarbon fluid for conducting the fluid into contact with the length of the outer surfaces of the membranes. Fluid admitted to the port 18 will flow through the chamber "A", the bores 34 of the fibers 28, and the chamber "C", and then exit through the port 20 to a deposit for dried hydrocarbon fluid.

Referring now to FIG. 2, there is seen in cross-section (although not in true scale with respect to the wall thickness), a single fiber 28. FIG. 2 serves to illustrate the mechanism by which the fibers 28 of the apparatus 10 function as a membrane 26 to remove moisture from a wet gas.

The wet gas, designated for convenience in FIG. 2 by the letter "W", having entered the port 22, is seen to flow in a direction axially with respect to the fiber 28 (and therefore, the housing 12), along the outer wall of the fiber 28. A sweep stream of compressed air, designated by the letter "S", traverses the bore 34 of the fiber 28 in counter flow to the direction of the wet gas "W". A positive osmotic pressure gradient is maintained across the wall 38 of the fiber 28 from its outer wall 40 to its inner wall 42. In practice, the pressure external to the fiber 28, that is, within the chamber "B", is maintained in excess of the pressure within the bore 34 so as to encourage transport material across the wall of the fiber 28 to the bore 34 by providing a greater amount of water to be transported over time by compressing the water vapor with the fiber. It will be recognized, of course, that although a positive osmotic pressure gradient (Po greater than Pi) is advantageously maintained, by maintaining the internal convective pressure (Pi of sweep stream) at suitably high level, collapsing of the fibers 28 may be avoided. The pressure of the wet gas may range from a few psi to in excess of 1000 psi, so long as the fibers do not collapse Mass transfer efficiency is enhanced by higher pressure by the increased water concentration per unit volume of wet gas vented thereby.

The fibers 28 of the membrane 26 in the illustrated apparatus 10 are hydrophilic, unsupported, and selectively permeable to diffusion water and dissolved water soluble components but not to the gaseous medium in which the water is entrained (in natural gas, for example, principally methane). By being unsupported, fluid flow is continuous and uninterrupted over the surface of the fibers. This exposed fluid flow to an increased surface area as compared to prior art supported and interrupted membrane surfaces, contributing positively to the relative fluid dynamics of the system. The water, being absorbed in the fiber 28, ultimately diffuses through the wall of the fiber 28 to the inner wall 42. The sweep stream "S" of air flowing within the bores 34 carries away water molecules as they appear on the inner wall 42 of the fiber 28. Water emerging on the inner wall 42 is continuously removed by the sweep stream. Thus, the membrane are diffusion means consisting essentially of unsupported, nonporous cuproammonium cellulose having continuous uninterrupted surfaces. The sweep stream provides water removing means for driving the diffusion dynamics for removing at least 95% of the water and dissolved water soluble components from the hydrocarbon fluid during the single pass of the hydrocarbon fluid over the length of the fibers. The sweep stream acting as the water removing means, in combination with the ultra-thin cuproammonium cellulose membranes and the unobstructed continuous nonporous membrane surface, provide significantly improved results in separation dynamics when compared to prior art systems. These factors contribute to the ability of the subject apparatus for removing at least 95% of the water and dissolved water soluble components from the hydrocarbon fluid during a single pass of the hydrocarbon fluid over the length of the fibers.

It is desirable that the fibers in the apparatus 10 be as small as practical, because smaller fibers have a greater pressure tolerance, exhibiting more resistance to collapse than larger fibers. Also, smaller and therefore more numerous fibers present more surface area for fluid transport, and hence, higher efficiency.

FIG. 4 illustrates a multiplicity of fibers 28, associated with a housing 12, and depicts visually the cumulative effect of the operation of the individual fibers 28 in the manner described above in connection with FIG. 2.

Referring now to FIG. 5, there is seen an assembly, designated generally by the reference numeral 44, of a four-module apparatus, in which individual modules 46, 48, 50 and 52 are assembled in a counter-current flow mode. Wet gas, admitted to the apparatus 44 at the wet gas feed port 54, flows in series through the modules 46, 48, 50 and 52 to exit as a dry gas discharge at the dry gas discharge port 56. The dry air sweep stream enters a manifold 58 at a dry air inlet port 60, and passes in parallel through the bores of the respective fibers (not shown) of the membranes disposed within the modules 46, 48, 50 and 52. The dry air sweep stream passes in parallel through the modules 46, 48, 50 and 52 to a manifold 62, and then to a wet exhaust air outlet port 64.

Membranes suitable for use in the present invention include hydrophilic cellulosic membranes of the Loeb and Sourirajan type and those described in Vol. 2, "Synthetic Membranes, Hyper-and Ultrafiltration Use", American Chemical Society Symposium Series 154, Albin F. Turbak, Editor (1981). Cellulosic membranes of the dialysis type may be used. For different applications, the permeabilities of suitable membranes may range from virtually "nil" to as high as 20 ml. water per hr./millimeter Hg./square meter.

A second embodiment of the present invention is schematically shown at FIG. 6. This embodiment is particularly useful in industrial applications where water is contaminate by hydrocarbons, fluorinated hydrocarbons, or PCB's.

More specifically, the assembly includes a filter module 60 made in accordance with the present invention, but containing a plurality of nonporous self-supported hollow fibers of regenerated cuproammonium cellulose. A storage tank 92 containing a mixture of hydrocarbon, such as oil, contaminated water 94 is in fluid communication with the outer surface of the membranes within the housing 60 through conduit 66. A positive pressure is exerted on the in-flowing mixture through the inlet 68 to the housing 60 by a pump 90. Water diffusing through the plurality of hollow fibers are collected by gravity flow and leave the housing 60 through outlets 72,74 and are conducted through conduits 76,78 to a collection source not shown. Mixture, which has been concentrated due to the separation of water therefrom, leaves the housing 60 through outlet 80 and is recycled through conduit 82 back to the storage tanks 92. Continual recirculation of the mixture concentrates, the mixture as it is collected in the tank 92 Periodically, additional mixture can be added to the tank 92 through conduit 84. Valve 86 selectively controls the flow of fluid mixture through conduit 84 into the tank 92.

The second embodiment provides for a method of separating water from the water and hydrocarbon or halogenated hydrocarbon mixture including the steps of conducting the water and hydrocarbon mixture into contact with the outside of the membranes consisting of the nonporous self supported hollow fibers of cuproammonium cellulose having inside and outside surfaces and imbibing the water from the mixture into the membranes and diffusing the water to the opposite side of the membranes. As discussed above, the water is removed from the second side of the membranes ultimately through conduits 76,78 and the remaining mixture is removed from the first side of the membranes ultimately through conduit 82 and back to the storage tank 92 for recirculation and concentration.

Unlike prior art assemblies utilizing membranes such as cellulose acetate membranes, the present invention can provide for recirculation and concentration of the water contaminated with hydrocarbon for an extended period of time without fouling or degeneration. Such a system utilizing cellulose acetate membranes would not be able to effectively separate contaminated water from the water hydrocarbon mixture, nor would it be able to withstand the continual recirculation and concentration of the mixture. Cellulose acetate membranes in such a situation would degrade and eventually contaminate the system. Unlike prior art dialysis systems utilizing cuproammonium cellulose membranes, the present system exposes the membrane to fluids that would be corrosive and degenerative to other membranes, but, unexpectedly, the present invention is capable of long exposure to the fluids without degradation.

EXAMPLE 1

In an experimental apparatus 10, using a single module of the kind illustrated in FIG. 1, the membrane 26 comprised hollow fibers of regenerated cuproammonium cellulose having an effective surface area of one square meter ($m^2$). The working volume of the membrane was 125 cc (0.125 l).

Wet methane gas was directed through the apparatus in contact with the outer walls of the fibers constituting the membrane, and a sweep stream of dry nitrogen was simultaneously directed through the bores of the fibers.

In one run, the temperature of the wet methane was 80° F. with a dew point of 78° F. The molar flow rate of the methane, on a bone-dry basis, was $4.1 \times 10^{-3}$ gmoles/min. and the water flow rate in was $1.1 \times 10^{-4}$ gmoles/min. The nitrogen had a temperature at input of 79° F. and a dew point of $-70°$ F., with a molar flow rate of $1.9 \times 10^{-2}$ gmoles/min. The methane leaving the apparatus had a temperature of 74° F. with a dew point of 4.5° F. (although this water content was below the lower limit of the instrument measurement range). The water flow rate associated with the output methane was $6.7 \times 10^{-6}$ gmoles/min., with the results indicating conservatively (due to the above-noted instrument limitation) that 94% of the water was removed from the methane. The exhaust nitrogen showed a temperature of 74° F., a dew point of 48° F., and a water flow of $2.3 \times 10^{-4}$ gmoles/min. After eight hours of operation, the above run had not yet reached steady state.

EXAMPLE 2

In another run, however, using a much higher flow rate (four times greater than the above-described run), steady rate operation was achieved. In that run, after 30 hours of operation, the dew point of the nitrogen exhaust reached 22° F.±1° F., and thereafter remained stable, indicating that a steady rate had been reached. The dew point of the exit was measured at 1.5° F., indicating that over 95% of the water had been removed.

The above example indicates that the present apparatus 10 is capable of removing over 95% of the water from a wet methane stream, and is estimated to be capable of removing in excess of 99% (the equivalent to a dew point of about $-25°$ F. at the conditions of the experiment) of the water. On the basis of these results, it is believed that a dew point of $-50°$ F. or less is ultimately achievable using the present apparatus and method.

EXAMPLE 3

Water contaminated with approximately 3% heavy crude oil was allowed to flow through a module containing two square meters surface area of cuproammonium cellulose hollow fibers. The crude oil contaminated water was allowed to flow on the outside of the hollow fibers. Water immediately diffused through the hollow fiber membrane walls and was allowed by gravity to flow from the inside of the hollow fibers into a collection container. The appearance of the water separated from the crude oil contaminated water was glass clear and water white, whereas the contaminated water was dark brown in color. Concentrations of toluene, xylene and ethylbenzene were determined in the water contaminated with crude oil before passing through the hollow fiber membrane. The concentration of toluene of 0.066 ppm, xylene 0.263 ppm and ethylbenzene 0.062 ppm before separation and were not detectable in the clean water which passed through the membrane when analyzed at detection limits of 0.005 ppm using high performance liquid chromatographic techniques. A second run using the same setup was carried out with a sample of water intentionally contaminated with 10 ppm tetrachloroethylene. The results were that the water permeating the membrane had no detectable tetracloroethylene when analyzed by high performance liquid chromatographic techinques.

The examples disclosed above show that the present invention ca be effectively used for decontaminating water and returning water back to the environment in a safe condition, the process for accomplishing this being highly efficient and effective.

The present invention further provides a method for removing the water and dissolved water soluble components from the hydrocarbon fluid. Generally, the method includes the steps of passing the stream of hydrocarbon fluid directly in contact with and along the length of the uninterrupted, unsupported surface of the plurality of hollow nonporous cuproammonium cellulose membrane fibers in a single pass. The fibers are selectively permeated by diffusion with only water and dissolved water soluble components from the hydrocarbon fluid as the hydrocarbon fluid contacts the fibers. The water and dissolved water soluble components dissolving through the membrane are removed from the other side of the membrane driving the diffusion dynamics and removing at least 95% of the water in dissolved water soluble components from the hydrocarbon fluid. By the continuous removal of the water and dissolved water soluble components diffusing through the membrane from the inner core of the fibers, a transmembrane gradient of water and dissolved water soluble components diffusing across the membrane is maintained.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. In a method for drying a wet stream of hydrocarbon gas by the use of a hollow fiber membrane while producing a hydrocarbon free water permeate, the steps of; employing as a membrane nonporous self-supported hollow fibers of cuproammonium cellulose, conducting the wet hydrocarbon gas stream into contact with the outside of the fibers, osmotically imbibing water independently of convective pressure of the stream of gas from the stream into the fibers while preventing imbibing or permeation of hydrocarbons; diffusing the water free of hydrocarbons to the bores of the fibers, removing the imbibed water free of hydrocarbons from inside the bores, and removing the dry gas from outside of the membrane.

2. A method as set forth in claim 1 wherein the material for the fibers has a permeability to water of up to 20 ml. water per hour per Hg. per square meter.

3. A method as set forth in claim 2 wherein the wet gas stream comprises principally methane.

4. A method of separating water from a water and hydrocarbon or halogenated hydrocarbon mixture comprising the steps of: conducting a water and hydrocarbon or halogenated hydrocarbon mixture into contact with one side of a membrane bundle consisting of nonporous self-supported hollow fibers of suproammonium cellulose having inside and outside surfaces, osmotically imbibing the water permeate free from hydrocarbons and/or halogenated hydrocarbons from the mixture into the fibers independently of convection pressure of the mixture and diffusing the water permeate free of hydrocarbons and/or halogenated hydrocarbons to the opposite side of the fibers while preventing permeation and imbibing of any hydrocarbon or halogenated hydrocarbon into the fibers; removing the water permeate free from hydrocarbons and/or halogenated hydrocarbons from the second side of the fibers; and removing the remaining mixture retentate from the first side of the fibers.

5. A method as set forth in claim 4 wherein said step of removing the water is further characterized as removing the water by gravity flow.

6. A method as set forth in claim 5 further including the steps of recirculating the mixture removed from the first side of the membrane over the first side of the membrane and concentrating the mixture with each pass by removing water with each pass over the membrane.

7. A method as set forth in claim 6 wherein the recirculating step is further defined as storing the mixture removed from the second side of the membrane and selectively combines additional mixture with the stored mixture and selectively conducting the stored mixture to the first side of the membrane.

* * * * *